(12) United States Patent
Sahu et al.

(10) Patent No.: US 9,397,564 B2
(45) Date of Patent: Jul. 19, 2016

(54) DC-DC SWITCHING REGULATOR WITH TRANSCONDUCTANCE BOOSTING

(71) Applicants: Biranchinath Sahu, Bangalore (IN);
Jitendra K. Agrawal, Bangalore (IN);
Dattatreya B. S., Bangalore (IN)

(72) Inventors: Biranchinath Sahu, Bangalore (IN);
Jitendra K. Agrawal, Bangalore (IN);
Dattatreya B. S., Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 158 days.

(21) Appl. No.: 13/628,779

(22) Filed: Sep. 27, 2012

(65) Prior Publication Data

US 2014/0084887 A1 Mar. 27, 2014

(51) Int. Cl.
*G05F 1/00* (2006.01)
*H02M 3/158* (2006.01)
*H02M 3/156* (2006.01)

(52) U.S. Cl.
CPC ...... *H02M 3/158* (2013.01); *H02M 2003/1566* (2013.01)

(58) Field of Classification Search
CPC ............... H02M 3/156; H02M 3/158; H02M 2003/1566; G05F 1/575
USPC ......... 323/311, 312, 315, 316, 317, 282, 284, 323/285, 351
See application file for complete search history.

(56) References Cited

U.S. PATENT DOCUMENTS

| 5,999,052 | A  | * | 12/1999 | Tang .............................. 330/254 |
|---|---|---|---|---|
| 6,674,274 | B2 | * | 1/2004 | Hobrecht et al. ............. 323/285 |
| 7,135,841 | B1 | * | 11/2006 | Tomiyoshi et al. ........... 323/224 |
| 7,339,435 | B2 | * | 3/2008 | Saito .................... H03F 1/0277 330/285 |
| 7,446,520 | B2 | * | 11/2008 | Hung ............................ 323/284 |
| 7,489,121 | B2 | * | 2/2009 | Qiu et al. ....................... 323/284 |
| 8,723,552 | B2 | * | 5/2014 | Tseng et al. ................... 323/282 |
| 2002/0017897 | A1 | * | 2/2002 | Wilcox et al. ................. 323/282 |
| 2002/0125871 | A1 | * | 9/2002 | Groom et al. ................. 323/284 |
| 2002/0125872 | A1 | * | 9/2002 | Groom .................. H02M 3/156 323/288 |
| 2009/0001945 | A1 | * | 1/2009 | Wickersham et al. ........ 323/263 |
| 2011/0316518 | A1 | * | 12/2011 | Feng ..................... H02M 3/156 323/349 |
| 2012/0043946 | A1 | * | 2/2012 | Dong et al. ................... 323/234 |

* cited by examiner

*Primary Examiner* — Adolf Berhane
*Assistant Examiner* — Alex Torres-Rivera
(74) *Attorney, Agent, or Firm* — William B. Kempler; Frank D. Cimino

(57) ABSTRACT

A switching regulator comprising a droop amplifier responsive to a reference voltage and a feedback voltage to generate a droop voltage. The droop amplifier includes a boost circuit configurable to increase a transconductance of the droop amplifier during an upward transition of the reference voltage. The switching regulator further includes a comparator responsive to the droop voltage and a current sense signal. The comparator is configured to initiate switching in the switching regulator.

14 Claims, 4 Drawing Sheets

DC-DC SWITCHING REGULATOR WITH TRANSCONDUCTANCE BOOSTING

TECHNICAL FIELD

Embodiments of the disclosure relate to DC-DC switching regulators.

BACKGROUND

DC-DC switching regulators with a finite load line are used to reduce output capacitance while meeting transient response. In such regulators, the load-line depends on the inductor current, not the actual load current. When the regulator transitions from a lower to a higher voltage, the output is lower than the target reference by load-line (droop) voltage that corresponds to the inductor current, since the output capacitor needs to be charged, at the end of the reference transition. If the load transient is applied after the reference transition, the output would go lower than its actual target voltage for the given load current, thereby violating the specification of the power supply and possibly resulting in malfunction of the load system.

SUMMARY

An example embodiment provides a switching regulator comprising a droop amplifier, responsive to a reference voltage and a feedback voltage, to generate a droop voltage. The droop amplifier includes a boost circuit configurable to increase a transconductance of the droop amplifier during an upward transition of the reference voltage. The switching regulator further includes a comparator responsive to the droop voltage and a current sense signal. The comparator is configured to initiate switching in the switching regulator.

Another example embodiment provides a switching regulator comprising a droop amplifier, responsive to a reference voltage and a feedback voltage, to generate a droop voltage; the droop amplifier comprising a boost circuit configurable to increase a transconductance of the droop amplifier during an upward transition of the reference voltage. The droop amplifier comprises a main resistor and an auxiliary resistor, the auxiliary resistor being coupled in parallel to the main resistor in response to the upward transition of the reference voltage through a switch. The boost circuit comprises the auxiliary resistor coupled to a switch, the switch being controlled to activate the boost circuit during an upward transition of the reference voltage. The switching regulator further includes a comparator responsive to the droop voltage and a current sense signal, the comparator being configured to initiate switching in the switching regulator. The resistances of a main resistor and the auxiliary resistor are added in parallel upon activation of the boost circuit such that the transconductance of the droop amplifier is increased thereby increasing gain of the droop amplifier.

Other aspects and example embodiments are provided in the Drawings and the Detailed Description that follows.

BRIEF DESCRIPTION OF THE VIEWS OF DRAWINGS

Figure 4:
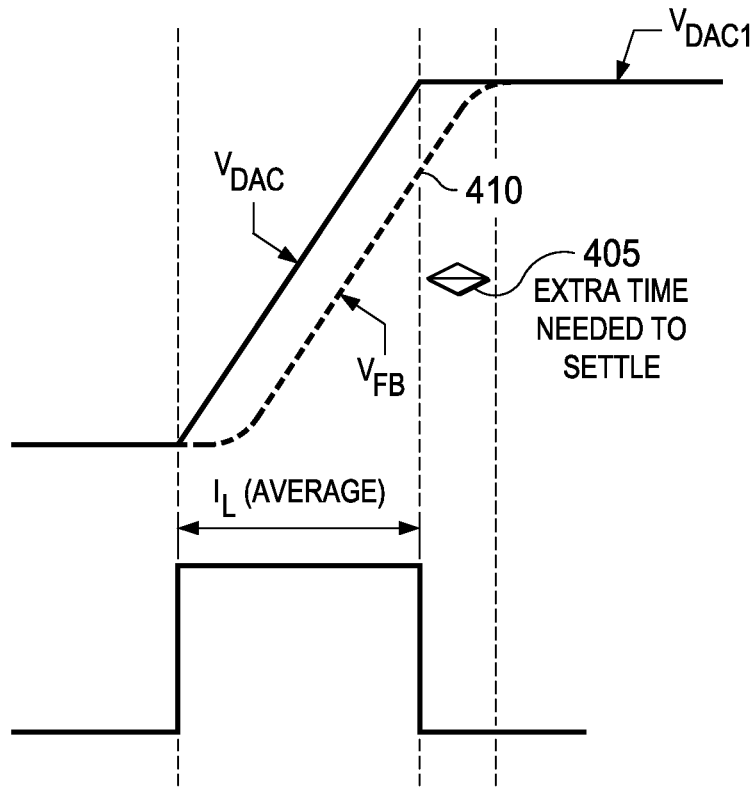
Figure 5:
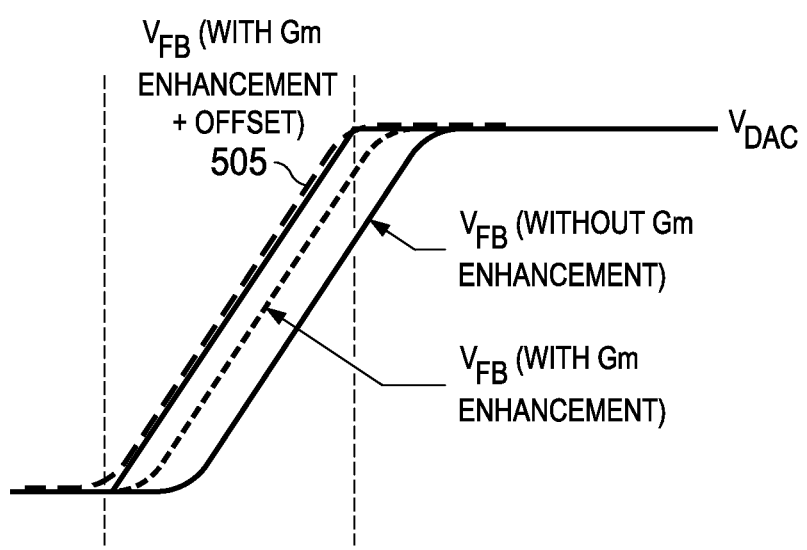
Figure 6:
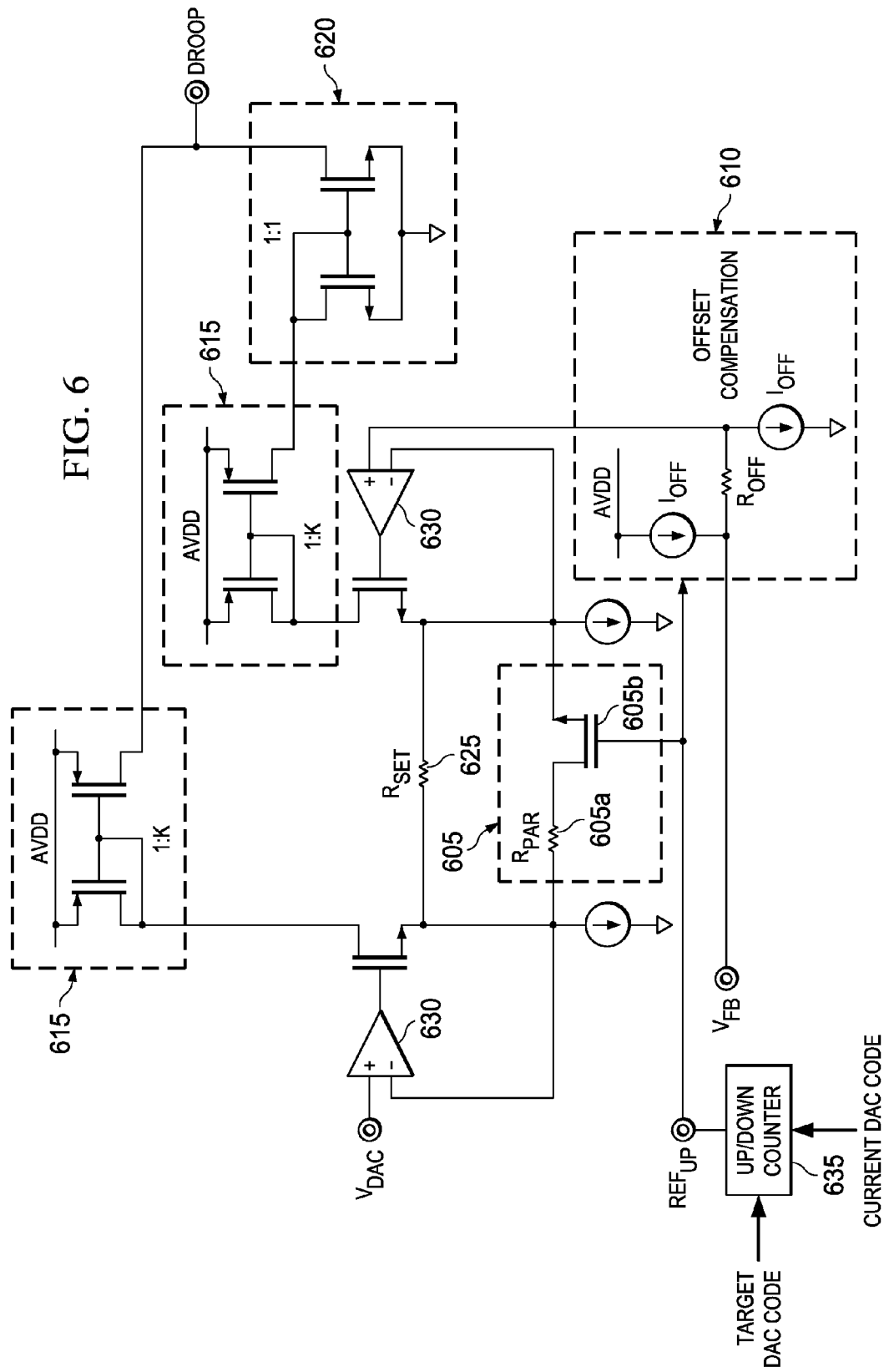

FIG. 4 pictorially illustrates the DAC behavior during reference transition;

FIG. 5 illustrates the improvement in the output voltage tracking in the switching regulator having a boost circuit and offset compensation circuit according to an embodiment; and FIG. 6 illustrates the circuit diagram of the droop amplifier having the boost circuit and offset compensation circuit in a DC-DC switching regulator.

DETAILED DESCRIPTION OF THE EMBODIMENTS

Figure 1:
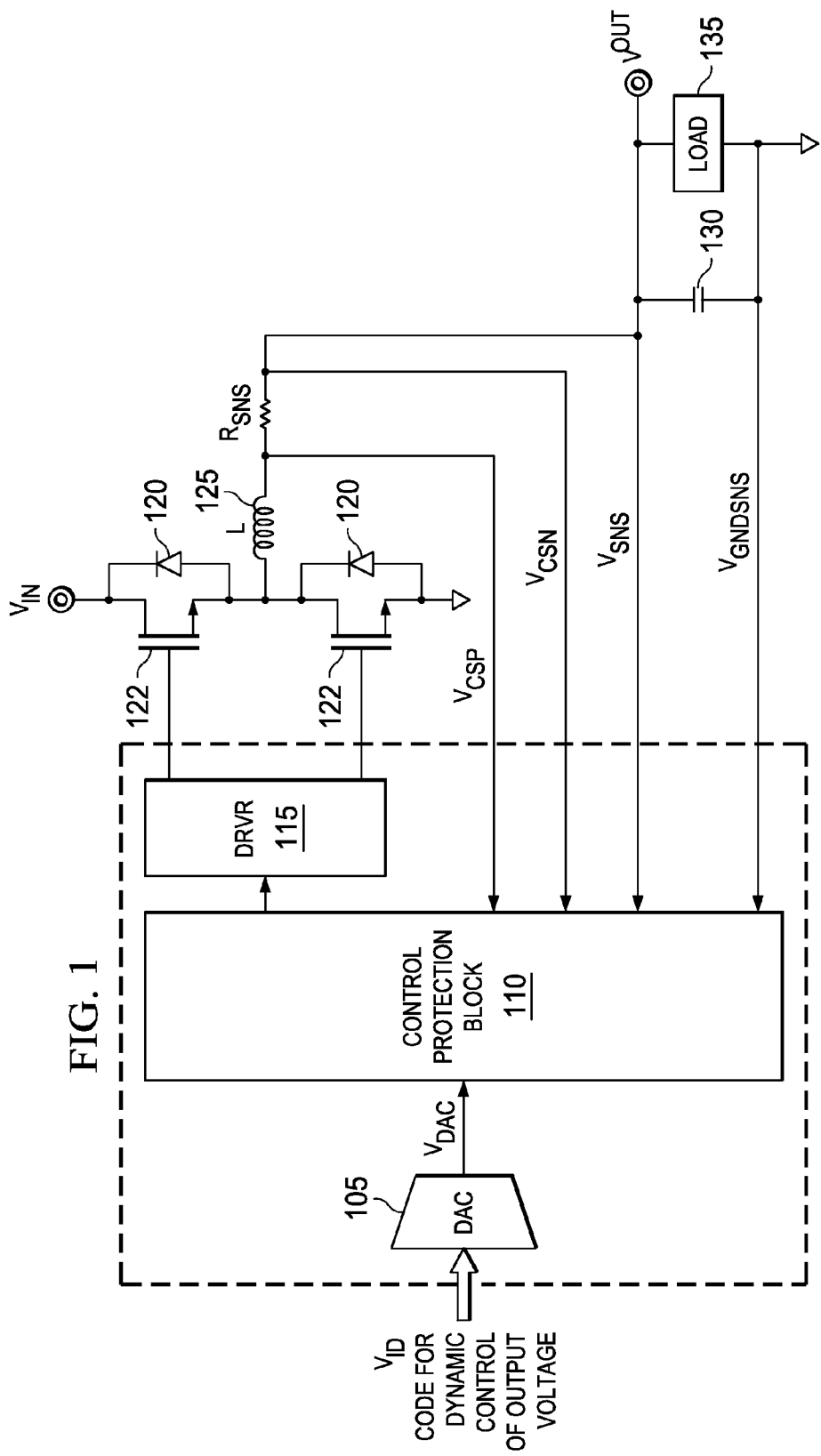
FIG. 1 illustrates a schematic of a DC-DC switching regulator with dynamic output voltage control.

FIG. 1 illustrates a DC-DC switching regulator with dynamic output voltage control. The DC-DC switching regulator, hereinafter, switching regulator includes a dynamic output voltage control block having a digital to analog converter (DAC) (105) connected to a control protection block(110) which is then connected to a driver. The driver 115 drives a set of transistors used as switches 122 (with their respective body diodes 120) in response to a driver signal or a control signal from the control protection block 110. A filter, having an inductor (125) and capacitor (130), is connected to the junction between a drain and source of the transistors. A load 135 is connected to the output of the switching regulator. Several voltage signals are fed back from the switching regulator stages to the control protection block namely, $V_{CSN}$ (current sense negative voltage), $V_{SNS}$ (sense voltage) $V_{GNDSNS}$ (ground sense voltage), and $V_{CSP}$ (current sense positive voltage). The inductor 125 is connected to the capacitor 130 to provide the output voltage of the switching regulator to the load 135.

Unlike a power supply with output voltage regulated to a fixed reference all the time, in the dynamic dc-dc switching regulators, output voltage is continuously modulated depending on the load conditions to save power, improve thermal performance, and extend battery life. The control reference for the power supply is typically set by a DAC whose input bits are either supplied through a serial or parallel bus from an intelligent host, which is tasked to provide control information to the power supply as a function of load requirement. For such power supplies, it is desirable to have a finite load line, which means the output voltage is regulated to a lower voltage than the nominal reference when load current increases. The advantage of having load-line or droop is that when the load is released, output voltage overshoot is lower than what would be seen if there is no load line in the power supply implementation. Alternatively, a smaller output capacitance can also be used in the power supply, thereby reducing cost and area footprint. The key to power supplies having load line is that the load works flawlessly with a lower output voltage as compared to the reference with increase in current.

Figure 2:
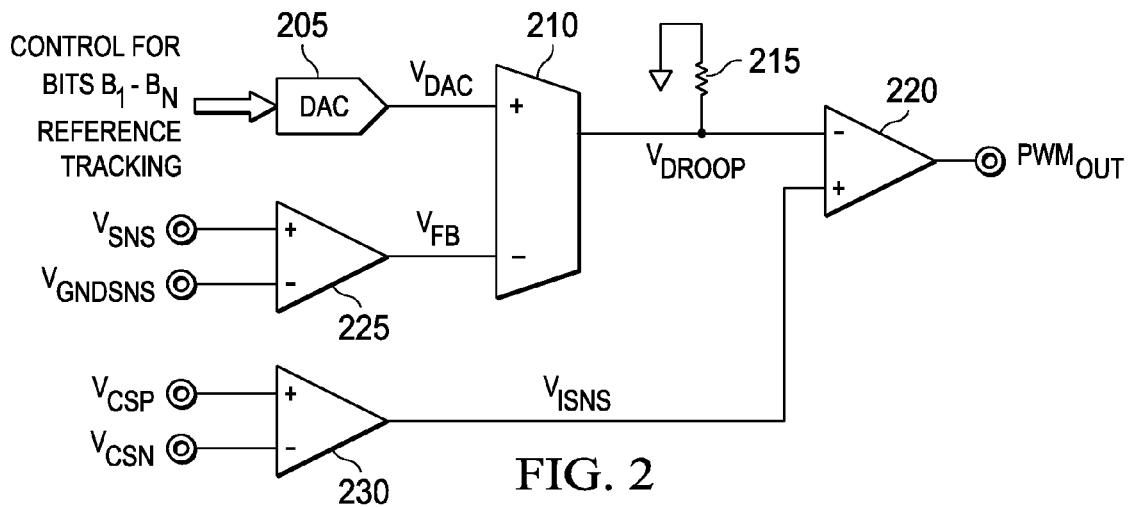
FIG. 2 illustrates a schematic of the control loop (inner current loop and outer voltage loop) with built-in droop, according to another embodiment.

FIG. 2 illustrates a block diagram of the control loop (inner current loop and outer voltage loop) with built-in droop. The block diagram includes a DAC 205 that receives control bits for reference tracking. The DAC generates a reference voltage $V_{DAC}$ that is connected to the droop amplifier. The droop amplifier 210 is characterized as a droop transconductance amplifier or in other words a droop amplifier with a transconductance of $G_{MDRP}$. The droop amplifier 210 receives the $V_{DAC}$ on a positive terminal and a feedback voltage $V_{FB}$ on a negative terminal. The feedback voltage $V_{FB}$ is generated from a differential amplifier 225 which is the difference of voltage signals $V_{SNS}$ and $GND_{SNS}$. A resistor (droop resistor) 215 is connected at the output of the droop amplifier 210. The voltage droop can be set using the resistor 215 which is an external resistor. A PWM comparator (comparator) 220 receives the output of the droop amplifier 210 and a current sense signal $V_{ISNS}$ and generates the PWM output. The signal $V_{ISNS}$ is amplified version of the differential signal between $V_{CSP}$ and $V_{CSN}$. The transconductance of the droop amplifier $G_{MDRP}$ is a designed parameter and provided to the end user so that resistance value of the resistor 215 can be chosen for a given application. The PWM comparator 220 compares $V_{DROOP}$ and current sense signal $V_{ISNS}$ and initiates switching when $V_{ISNS}$ goes below $V_{DROOP}$.

Figure 3:
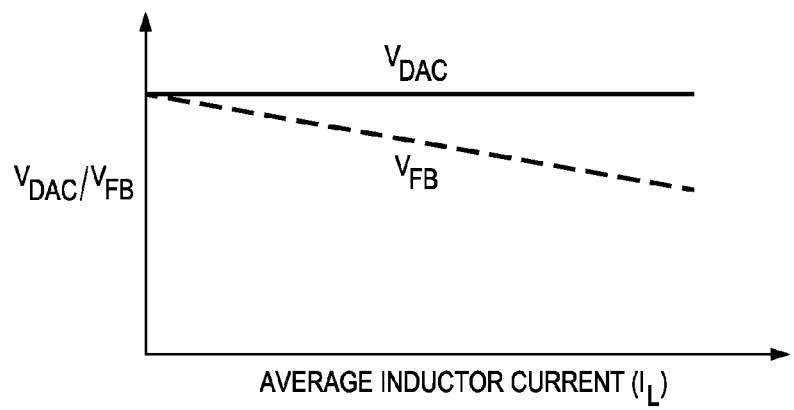
FIG. 3 is a graph illustrating the characteristics of $V_{DAC}$ and $V_{FB}$.

Therefore, the mathematical models for the above operating conditions can be expressed as follows:

$$A_{ISNS}(V_{CSP} - V_{CSN}) =$$
$$G_{MDRP}R_{DRP}(V_{DAC} - V_{FB}) \Rightarrow V_{FB} = V_{DAC} - \frac{A_{ISNS}}{G_{MDRP}R_{DRP}} \times I_L R_{SNS}$$

wherein $A_{ISNS}$ is the gain of the current sense amplifer 230, $V_{CSP}$ is current sense positive, $V_{CSN}$ is current sense negative, $G_{MDRP}$ is transconductance of the droop amplifier, $R_{DRP}$ is droop resistance, $V_{DAC}$ is reference voltage, $V_{FB}$ is feedback voltage and $I_L$ is average inductor current. Consequently, as inductor current increases output voltage reduces as shown in FIG. 3. In FIG. 3, the X axis indicates average inductor current ($I_L$) and Y axis indicates the reference voltage ($V_{DAC}$)/feedback voltage ($V_{FB}$).

FIG. 4 pictorially illustrates the DAC behavior during reference transition. As a result of the in-built load line characteristics, when the converter (DAC) transitions from a lower reference to a higher voltage, although the actual load current can be very small, the inductor current is equal to the charging current of the output capacitance (of capacitor 130). The capacitance charging current depends on the slew-rate of the reference transition and the value of output capacitance. Therefore, at the time instance when reference transition is complete, the output voltage is lower than the target reference by an amount that corresponds to the droop associated with capacitor charging current (indicated as 410). By way of equation, $V_{FB1}$ will be the difference between $V_{DAC1}$ and $V_{DRP}$, where $V_{DAC1}$ is the target reference and $V_{FB1}$ is actual output voltage and $V_{DRP}$ is the droop associated with capacitor charging current. Depending on the droop at that instance, the converter may take additional time to reach its target (shown as 405). Therefore, the host controller has to wait for longer time before the power supply is ready to provide load demand without violating the desired load line specification.

To reduce the gain error completely, it is evident that the droop amplifier gain ($G_{MDRP}R_{DRP}$) needs to be a much higher than with which it operates under normal operating condition. Since the droop resistance ($R_{DRP}$) is set externally by the user, an embodiment increases the transconductance of the droop amplifier ($G_{MDRP}$) only during an upward transition of the reference voltage ($V_{DAC}$). Since it is impractical to boost the transconductance to a very high value because of practical limitations and stability considerations, to compensate for the error even after the gain enhancement, a fixed offset is introduced in the controller reference path. This offset could be a positive value in the reference path or a negative value in the feedback path only during DAC up transition. As soon as the DAC up transition is complete, the offset is removed, boost circuit is disabled and the converter operates with its nominal $G_{MDRP}$ setting.

FIG. 5 illustrates the improvement in the output voltage tracking in the switching regulator having a boost circuit and offset compensation circuit. It can be seen from FIG. 5 that, $V_{FB}$ with transconductance enhancement and offset compensation (505) is closer to $V_{DAC}$ in the DC-DC switching regulator thereby reducing the extra settling time required in case of the regulator without the boost circuit and offset compensation circuit.

FIG. 6 illustrates the circuit diagram of the droop amplifier 210 having the boost circuit 605 and offset compensation circuit 610 in a DC-DC switching regulator during upward transition of the DAC reference voltage according to an embodiment. The circuit illustrated in FIG. 6 is a circuit level implementation of the droop amplifier 210 of FIG. 2. The droop amplifier, that is configured to generate a droop voltage, includes the plurality of amplifiers 630 coupled to a plurality of transistors, a main resistor 625 coupled between the two transistors, a plurality of current mirrors 615 (with a ratio of 1: K) and 620 (with a ratio of 1:1). A boost circuit 605 is connected in parallel with the main resistor 625. The boost circuit includes an auxiliary resistor 605a connected to a switch 605b where the auxiliary resistor 605a is connected in parallel to the main resistor 625 when activated. The switch 605b is implemented using a transistor having a gate controlled by the upward transition of the reference voltage (REF$_{UP}$). The boost circuit 605 is activated during the upward transition of the reference voltage through the switch 605b. The boost circuit 605 is activated based on an output of an up/down counter 635 wherein the up/down counter receives a target DAC code and compares the target code against the current DAC code such that during the upward transition of the reference voltage the boost circuit is activated. Upon activation of the boost circuit, resistances of a main resistor 625 and the auxiliary resistor 605a are added in parallel upon activation of the boost circuit 605 such that the transconductance of the droop amplifier 210 is increased thereby increasing gain of the droop amplifier 210.

The droop amplifier further includes an offset compensation circuit 610 that compensates along with the boost circuit 605 such that the feedback voltage follows the reference voltage accurately. The compensation circuit 610 includes a resistor ($R_{OFF}$) coupled to a current source ($I_{OFF}$). The offset voltage is given as $I_{OFF}R_{OFF}$. In one embodiment, the offset compensation circuit 610 is in a feedback path of the switching regulator having a negative value. In another embodiment, the offset compensation circuit 610 is in a reference path of the switching regulator having a positive value. The offset compensation circuit 610 is configured to follow the slew rate of the upward transition of the reference voltage. It is noted that the boost circuit 605 and compensation circuit 610 are active only for higher reference slew-rate settings (selectable as one of eight settings). The slew-rate setting of reference for dynamic transition is digitized at start-up of the IC and programmable by the user and hence this information is used to enable boost circuit 605 as well as offset compensation circuit 610 for the reference.

In one embodiment, the transconductance of the circuit under normal operating condition is $K/R_{SET}$. During reference upward transition, the resistance of the auxiliary resistor 605a along with the switch series resistance is added in is parallel with the resistance of the main resistor 625, thereby increasing the transconductance of the circuit. Similarly the offset compensation circuit 610 is added in the feedback path, but disabled under normal operating condition of the switching regulator. Several embodiments does not use any additional complex circuitry for gain boosting and the same circuit for load line implementation can be reconfigured during upward transition of the control reference such that the settling delay is reduced from the DC-DC switching regulator. One embodiment provides a single reconfigurable circuit that offers two different droop values, one during reference high transition and the other required value during rest of the time when the power supply is operational. Use of minimal additional circuitry has advantages of no additional cost to the IC while seamless transition between reference transition and steady-state operation is achieved.

In one embodiment, since the droop voltage is dependent on the high gain of the droop amplifier, the transconductance and hence the gain is increased when the control reference of the power supply transitions from a lower to a higher voltage. Depending on the gain enhancement, the droop voltage is reduced to a lower value and hence the error at the end of the transition is reduced compared to the case where droop gain is not increased during reference transition. Further, the offset compensation circuit 610 in the controller compensates for error resulting from finite gain of the droop amplifier during upward reference transition.

In the foregoing discussion, the term "connected" means at least either a direct electrical connection between the devices connected or an indirect connection through one or more passive or active intermediary devices. The term "circuit" means at least either a single component or a multiplicity of components, either active or passive, that are connected together to provide a desired function. The term "signal" means at least one current, voltage, charge, data, or other signal.

The forgoing description sets forth numerous specific details to convey a thorough understanding of the invention. However, it will be apparent to one skilled in the art that the invention may be practiced without these specific details. Well-known features are sometimes not described in detail in order to avoid obscuring the invention. Other variations and embodiments are possible in light of above teachings, and it is thus intended that the scope of invention not be limited by this Detailed Description, but only by the following Claims.

What is claimed is:

1. The switching regulator comprising:
a droop amplifier, responsive to a reference voltage and a feedback voltage, to generate a droop voltage; the droop amplifier comprising a boost circuit configurable to increase a transconductance of the droop amplifier during an upward transition of the reference voltage; and
a comparator responsive to the droop voltage and a current sense signal, the comparator being configured to initiate switching in the switching regulator and wherein the boost circuit comprises an auxiliary resistor coupled to a switch, the switch being controlled to activate the boost circuit during the upward transition of the reference voltage, wherein the boost circuit is activated based on an output of an up/down counter wherein the up/down counter receives a target DAC code and compares the target DAC code against the current DAC code such that during the upward transition of the reference voltage the boost circuit is activated.

2. The switching regulator of claim 1, wherein the droop amplifier comprises a main resistor and an auxiliary resistor, the auxiliary resistor being coupled in parallel to the main resistor in response to the upward transition of the reference voltage through a switch.

3. The switching regulator of claim 2, wherein the transconductance of the droop amplifier is increased thereby increasing gain of the droop amplifier.

4. The switching regulator of claim 1, wherein the reference voltage changes with time and wherein the reference voltage is generated from an output of a digital to analog converter.

5. The switching regulator of claim 1 further comprising an offset compensation circuit that compensates along with the boost circuit such that the feedback voltage follows the reference voltage.

6. The switching regulator of claim 1, wherein an offset compensation circuit is in a feedback path of the switching regulator having a negative value.

7. The switching regulator of claim 6, wherein the offset compensation circuit is configured to follow the slew rate of the upward transition of the reference voltage.

8. The switching regulator of claim 1, wherein an offset compensation circuit is in a reference path of the switching regulator having a positive value.

9. The switching regulator of claim 1 further comprising:
a plurality of switches responsive to an output of the comparator to switch the switching regulator; and
an LC filter coupled to the switching regulator.

10. A switching regulator comprising:
a droop amplifier, responsive to a reference voltage and a feedback voltage, to generate a droop voltage; the droop amplifier comprising a boost circuit at an input thereof configurable to increase a transconductance of the droop amplifier during upward transition of the reference voltage, wherein the droop amplifier comprises a main resistor and an auxiliary resistor, the auxiliary resistor being coupled in parallel to the main resistor in response to the upward transition of the reference voltage through a switch, and wherein the boost circuit comprises the auxiliary resistor coupled to the switch, the switch being controlled to activate the boost circuit during the upward transition of the reference voltage; and
a comparator responsive to the droop voltage and a current sense signal, the comparator being configured to initiate switching in the switching regulator, wherein resistances of the main resistor and the auxiliary resistor are added in parallel upon activation of the boost circuit such that the transconductance of the droop amplifier is increased thereby increasing gain of the droop amplifier, wherein the boost circuit is activated based on an output of an up/down counter wherein the up/down counter receives a target DAC code and compares the target DAC code against the current DAC code such that during the upward transition of the reference voltage the boost circuit is activated.

11. The switching regulator of claim 10 further comprising an offset compensation circuit that compensates along with the boost circuit such that the feedback voltage follows the reference voltage.

12. The switching regulator of claim 11, wherein the offset compensation circuit is in a feedback path of the switching regulator having a negative value.

13. The switching regulator of claim 11, wherein the offset compensation circuit is in a reference path of the switching regulator having a positive value.

14. The switching regulator of claim 11, wherein the offset compensation circuit is configured to follow the slew rate of the upward transition of the reference voltage.

* * * * *